United States Patent
Liu et al.

(10) Patent No.: US 12,393,763 B1
(45) Date of Patent: Aug. 19, 2025

(54) TIMING-BASED LAYER ASSIGNMENT

(71) Applicant: Cadence Design Systems, Inc., San Jose, CA (US)

(72) Inventors: Derong Liu, Austin, TX (US); Wing-Kai Chow, Austin, TX (US); Mehmet Can Yildiz, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 657 days.

(21) Appl. No.: 17/831,280

(22) Filed: Jun. 2, 2022

(51) Int. Cl.
*G06F 30/394* (2020.01)
*G06F 30/392* (2020.01)
*G06F 119/12* (2020.01)

(52) U.S. Cl.
CPC .......... *G06F 30/394* (2020.01); *G06F 30/392* (2020.01); *G06F 2119/12* (2020.01)

(58) Field of Classification Search
CPC ................................................... G06F 30/394
USPC .......................................................... 716/134
See application file for complete search history.

(56) References Cited

U.S. PATENT DOCUMENTS 10,860,764 B1 * 12/2020 Ding ............... G06F 30/392
2015/0113493 A1 * 4/2015 Lin ................ G06F 30/392
716/120

* cited by examiner

*Primary Examiner* — Eric D Lee
(74) *Attorney, Agent, or Firm* — Schwegman Lundberg & Woessner, P.A.

(57) ABSTRACT

Aspects of the present disclosure address systems and methods for timing-based layer assignment. Routing is performed on a set of nets of an integrated circuit design. The routing comprises generating a route between a first pin and a second pin of a net. An initial layer assignment is performed on the set of nets based on the routing. The initial layer assignment comprises assigning the route to a first layer of the design based on first preferred routing layer designation. Timing-based layer assignment is performed based on the initial layer assignment. The timing-based layer assignment comprises reassigning the route from the first layer to a second layer based on a second preferred routing layer designation determined based on a comparison of a first delay value associated with the first layer and a second delay value associated with the second preferred routing layer designation.

20 Claims, 7 Drawing Sheets

TIMING-BASED LAYER ASSIGNMENT

TECHNICAL FIELD

The present disclosure generally relates to the technical field of integrated circuit (IC) design. In particular, the present disclosure addresses systems and methods for timing-based layer assignment for IC designs.

BACKGROUND

An integrated circuit (IC) comprises cells of similar and/or various sizes, and connections between or among the cells. A cell includes several pins interconnected by wires to pins of one or more other cells. A design netlist describes the logical connectivity between cells in an IC design. A netlist can include a set of nets and each net includes two or more interconnected pins in the IC design.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process generally entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnections between or among the circuit components by determining precise connection paths (also referred to herein as "routing paths" or simply as "routes") for each net; and (5) verification, which checks the layout to ensure that it meets design and functional requirements.

As noted above, routing is a key operation in the physical design cycle. Advanced IC designs can comprise multiple layers in which routing can be performed. Within each layer, routing is typically performed in a single direction—either in a horizontal direction or a vertical direction. Layers in which routing is performed in the horizontal direction are referred to as "horizontal layers" and layers in which routing is performed in the vertical direction are referred to as "vertical layers." The multiple layers of IC designs are often arranged with alternative horizontal and vertical layers such that a horizontal layer is consecutive (adjacent) with a vertical layer.

Routing often includes a layer assignment process whereby each net's routing path is assigned to one or more layers to limit routing of the net to the assigned layers. Certain routing layers can be designated as preferred routing layers for nets in an IC design. Designations of preferred routing layers can be based on user input. When a given layer is designated as a preferred routing layer, routing is performed on the layer and/or layers above the designated preferred routing layer, but not on layers below the preferred routing layer. Often, resistance and capacitance (RC) values vary between routing layers with higher layers having smaller RC values compared to lower layers. When a routing path is assigned to a lower layer with a high RC value, a large signal delay for the net may result and can otherwise negatively impact timing of the net.

Aspects of the present disclosure address problems with conventional approaches to layer assignment by performing a timing-based layer assignment process in which a routing path of a net may be reassigned from a first layer assigned during initial layer assignment to a second layer determined to improve net timing (e.g., a reduction in signal delay). Consistent with some embodiments, a method corresponding to this improved approach to layer assignment comprises accessing data describing an integrated circuit design that includes a set of layers and a netlist comprising a set of nets. Global routing is performed for the set of nets. As an example, for a net comprising a first and second pin, routing the net comprises generating a route between the first pin and the second pin. An initial layer assignment operation is performed for the set of nets based on the routing. For example, during the initial layer assignment process, the route is assigned to a first layer from the set of nets based on a first preferred routing layer designation (e.g., designating the first layer or a layer below the first layer as a preferred routing layer).

Based on the initial layer assignment, timing-based layer assignment is performed on the set of nets. Following the above example, in performing the timing-based layer assignment, the route can be reassigned from the first layer to a second layer based on a second preferred routing layer designation. The second preferred routing layer designation can be determined based on a comparison of a first delay value associated with assignment of the route on the first layer and a second delay value associated with the second preferred routing layer designation. Each delay value comprises a measure of signal delay (e.g., Elmore delay) associated with the net. The data describing the IC design is updated based on the timing-based layer assignment. For some embodiments, the process described above is performed for nets that are determined to be timing-critical nets in an upstream process based on timing properties of the nets. Performing layer assignment in accordance with the methodology described above and herein improves net delay while also benefiting timing closure.

Figure 1:
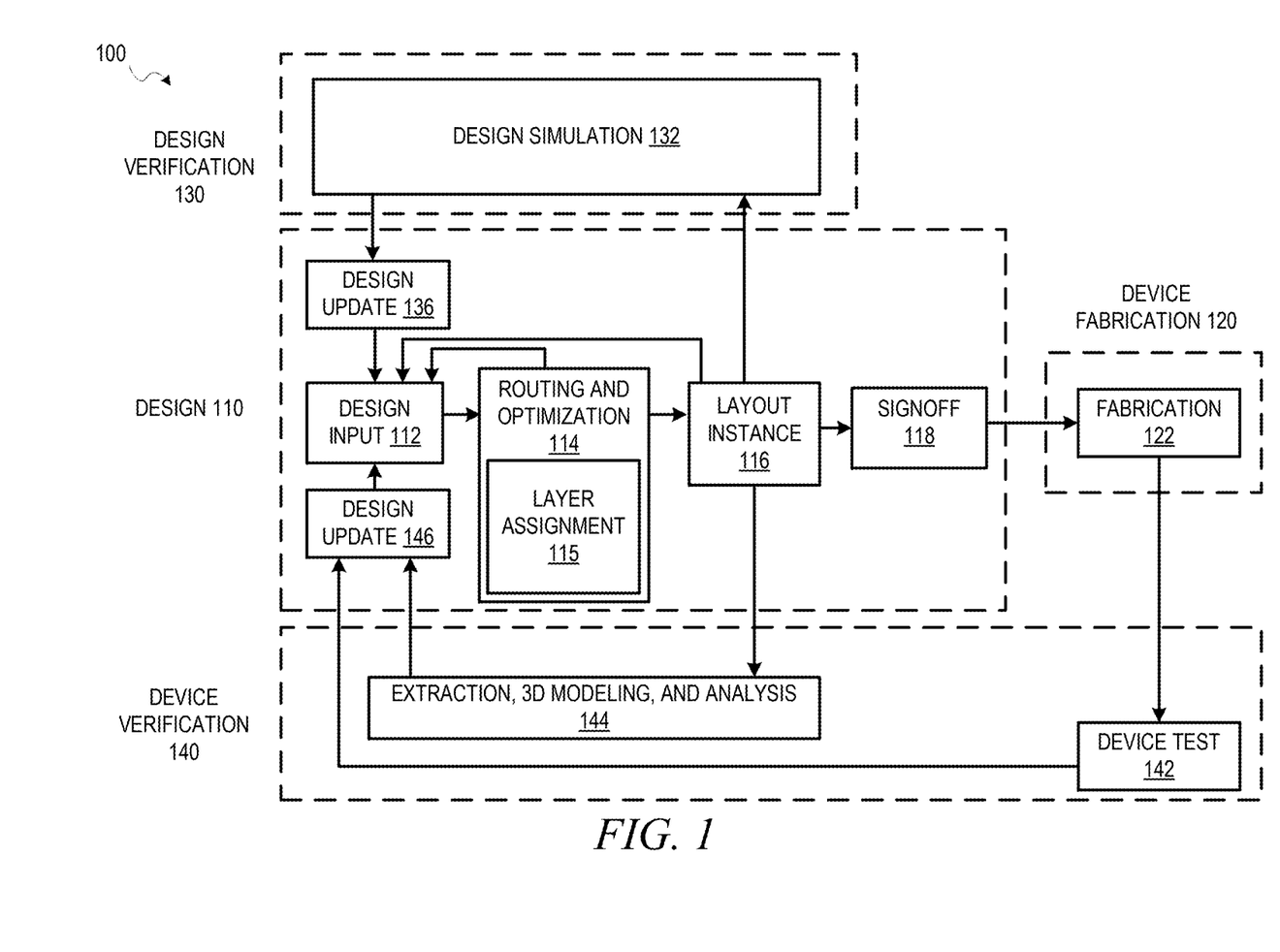
FIG. 1 is a diagram illustrating an example IC design process flow that includes timing-based layer assignment, according to some embodiments.

FIG. 1 is a diagram illustrating an example IC design process flow that includes routing density-aware layer assignment, according to some embodiments. As shown, the design process flow 100 includes a design phase 110, a device fabrication phase 120, a design verification phase 130, and a device verification phase 140. The design phase 110 involves an initial design input operation 112 where the basic elements and functionality of a device are determined, as well as revisions based on various analyses and optimization of a circuit design. This design input operation 112 is where block instances are used in the circuit design and any additional circuitry for the design around the blocks is selected. The initial strategy, tactics, and context for the device to be created are also generated in the design input operation 112, depending on the particular design algorithm to be used.

In some embodiments, following an initial selection of design values in the design input operation 112, routing and optimization are performed in at operation 114, along with any other automated design processes. While the design process flow 100 shows the routing and optimization operation 114 occurring prior to a layout instance 116, routing and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118 discussed below.

The routing and optimization operation 114 generally includes a layer assignment process 115 whereby nets are assigned to specific layers for routing. More specifically, the layer assignment process 115 can include an initial layer assignment and a subsequent timing-based layer assignment operation. For example, during the initial layer assignment a net may be assigned to a first layer (e.g., based on a first preferred routing layer designation) and during the timing-based layer assignment process the net may be reassigned to a second layer based on a second preferred routing layer designation. The second preferred routing layer designation is determined based on a comparison of delay values associated with designation of various layers as the preferred routing layer (e.g., based on assignment of one or more portions of the net on the various layers). A delay value, as referenced herein, refers to a measure of signal delay along a routed path (also referred to simply as a "route") of a net from a signal source (e.g., a first pin of the net) to a target (e.g., a second pin of the net). Generally, during timing-based layer assignment, a routed path of a net may be reassigned to a different layer that results in a reduction of delay compared to an initial layer to which the routed path is assigned. In this manner, the delay and timing closure of nets in the design is improved.

After design inputs are used in the design input operation 112 to generate a circuit layout, and any of the routing and optimization operations 114 are performed, a layout is generated in the layout instance 116. The layout describes the physical layout dimensions of the device that match the design inputs. Prior to this layout being provided to a fabrication operation 122, the signoff 118 is performed on the circuit design defined by the layout.

After signoff verification by the signoff 118, a verified version of the layout is used in the fabrication operation 122 to generate a device, or additional testing and design updates may be performed using designer inputs or automated updates based on design simulation 132 operations or extraction, 3D modeling, and analysis operations 144. Once the device is generated, the device can be tested as part of device test operation 142 and layout modifications generated based on actual device performance.

A design update 136 from the design simulation 132 operations; a design update 146 from the device test operation 142 or the extraction, 3D modeling, and analysis operations 144; or the design input operation 112 may occur after the initial layout instance 116 is generated. In various embodiments, whenever design inputs are used to update or change an aspect of a circuit design, a timing analysis and the routing and optimization operation 114 may be performed.

Figure 2:
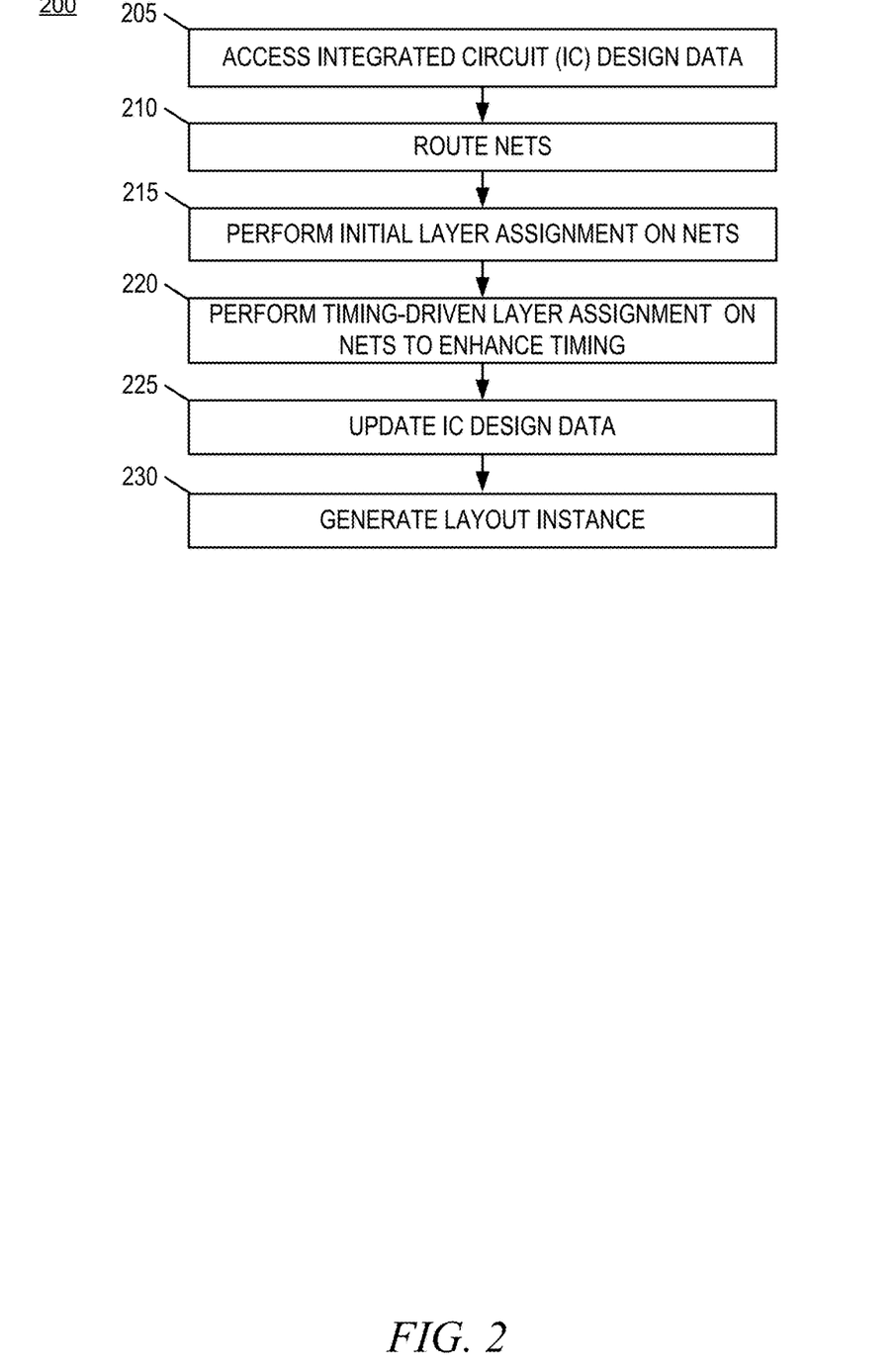
FIGS. 2-5 are flowcharts illustrating operations of a method for timing-based layer assignment, according to some example embodiments.
Figure 3:
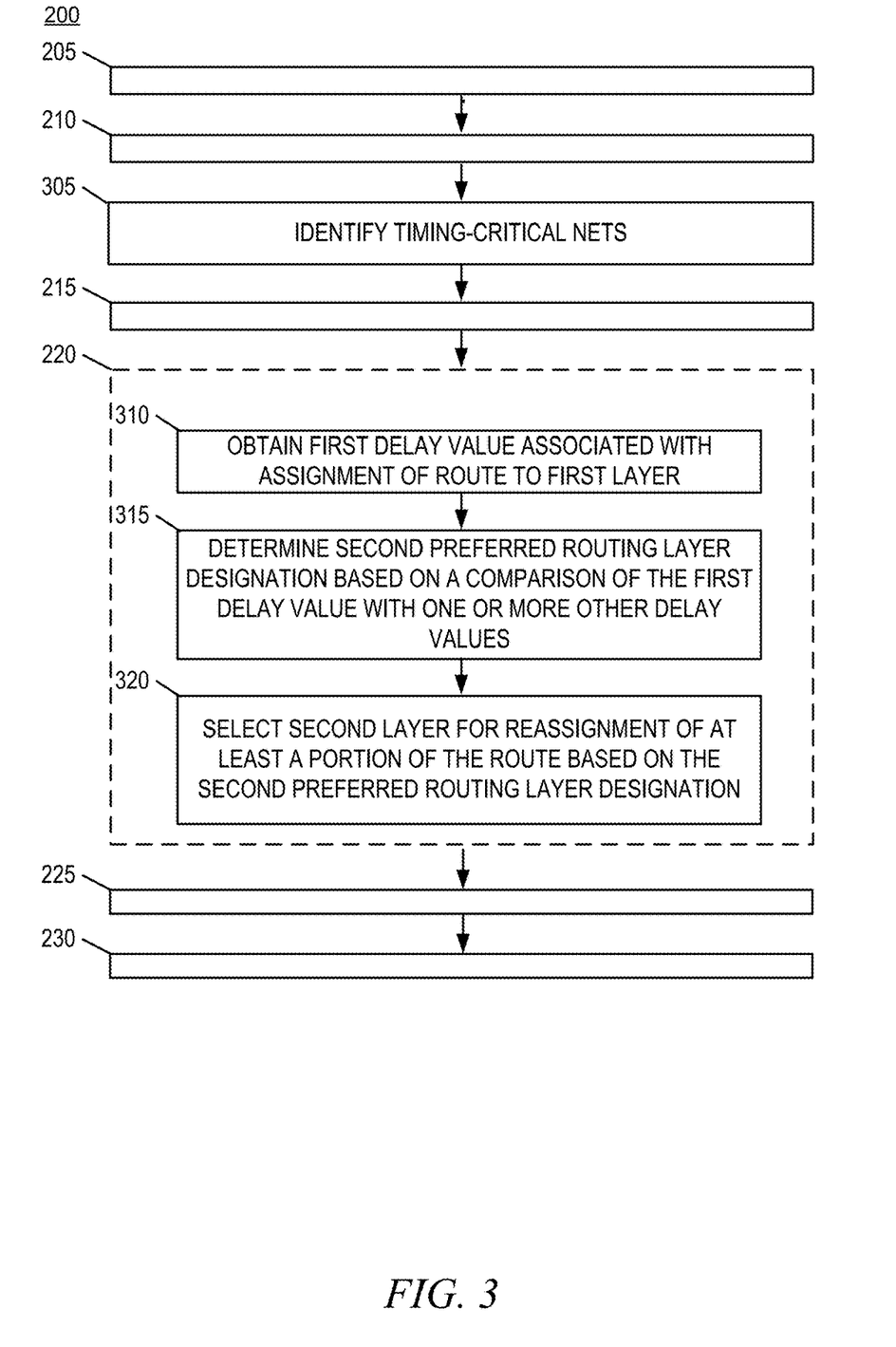
Figure 4:
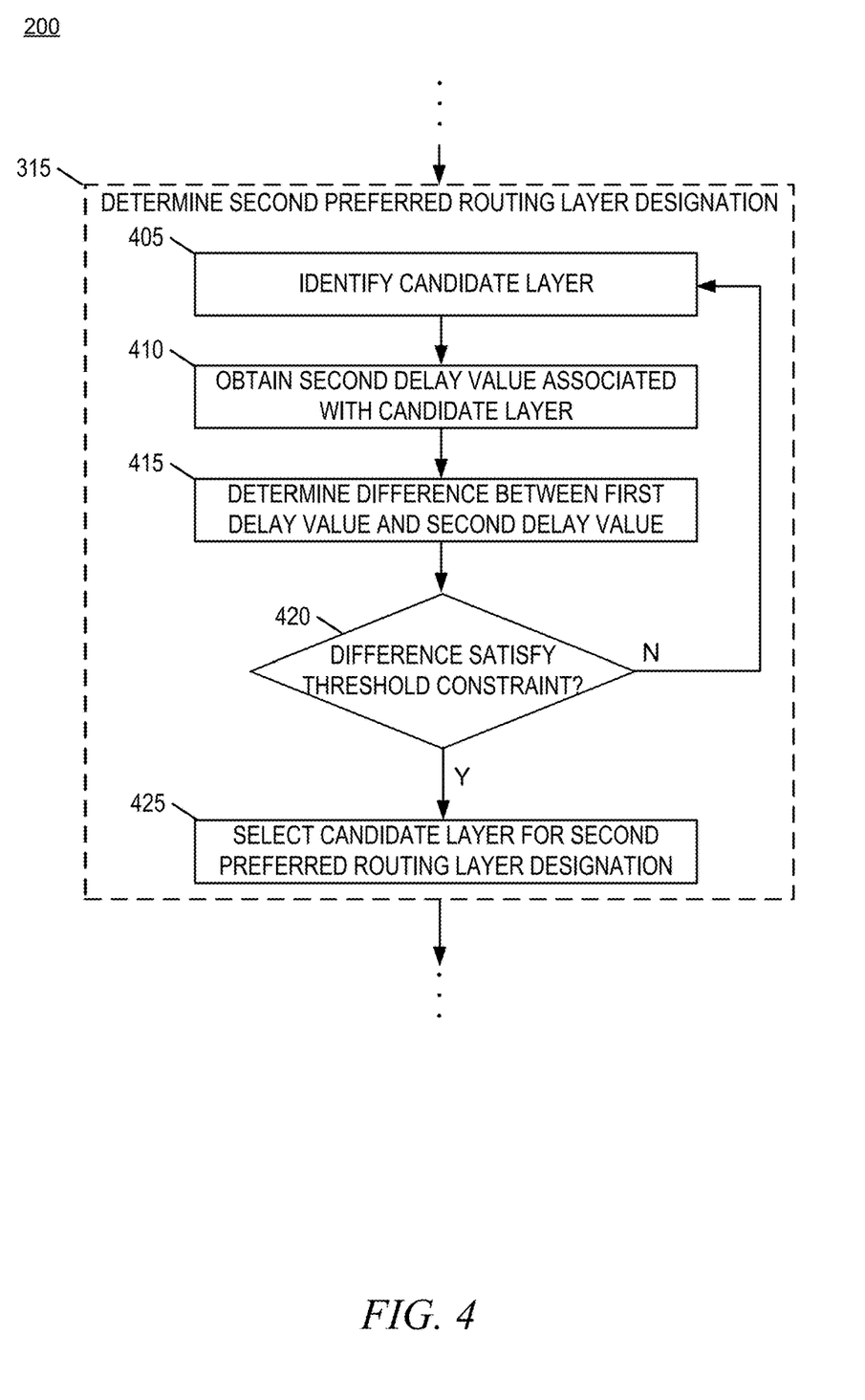

FIGS. 2-4 are flowcharts illustrating operations of a method 200 for timing-based layer assignment, according to some example embodiments. For some embodiments, the method 200 is performed as part of a placement process applied to a circuit design (e.g., by an EDA software system). It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses data describing an integrated circuit (IC) design (also referred to herein as "IC design data") from memory. The IC design data can comprise or correspond to one or more IC design files stored in memory. The IC design data includes a netlist that includes a set of nets. Each net specifies a connection between at least two pins. The IC design data further specifies a set of layers in which nets of the IC design can be routed. For some embodiments, one or more of the layers may be designated as a preferred routing layer for one or more nets, which results in priority being given to such designated layers during layer assignment processes.

At operation 210, the computing device routes the set of nets, and the computing device performs an initial layer assignment of the routed nets at operation 215. In performing routing, the computing device generates a single-layer route for each net and during layer assignment the computing device assigns the route to a layer from among the set of layers. For example, the computing device may generate a route for a net in the netlist and assign the route to a first layer from the set of layers. For some embodiments, assignment of the route to the first layer is based on a first preferred routing layer designation. For example, the first layer may be designated as a preferred routing layer or may be above a layer designated as a preferred routing layer. That is, when a given layer is designated as a preferred routing layer, nets are assigned to the preferred routing layer or one of the layers above the preferred routing layer.

The computing device, at operation 220, performs timing-based layer assignment on the set of nets to enhance timing characteristics of the nets. In performing timing-based layer assignment, the computing device reassigns one or more portions of one or more routes of one or more nets from an initially assigned layer (determined during the initial layer assignment, for example, based on a first preferred routing layer designation) to a different layer that provides an improvement to the timing of the net such as a reduction in signal delay along the route between the first pin and the second pin. As an example, during timing-based layer assignment, the computing device can reassign at least a portion of the route of the net from the first layer to a second layer based on a second preferred routing layer designation determined from a comparison of a first delay value associated with assignment of the route on the first layer and a second delay value associated with a second preferred routing designation (e.g., a different layer being designated as a preferred routing layer). The second delay value comprises a measure of signal delay associated with the second preferred routing designation for the net (e.g., based on a least a portion of the route being assigned to a second layer). Consistent with these embodiments, the computing device selects a different layer for designation as the preferred routing layer based on the comparison of delay values, and the computing device performs the layer reassignment based on the second preferred routing designation. That is, the computing device may reassign at least a portion of the route from the first layer to the second layer based on the second layer or a layer below the second layer being designated as the preferred routing layer based on the comparison of delay values. Further details regarding timing-based layer assignment are discussed below in reference to FIGS. 3-5.

At operation 225, the computing device updates the IC design data based on the timing-based layer assignment of the set of nets. In updating the IC design data, the computing device updates the IC design data with data describing the result of timing-based layer assignment. The computing device, at operation 230, generates a design layout instance for the IC device design based in part on the incremental layer assignment. The layout describes the physical layout dimensions of the IC device.

As shown in FIG. 3, the method 200 may, in some embodiments, further include operations 305, 310, 315, and 320. For some embodiments, the operation 305 can be performed prior to operation 210 where the computing device performs routing on the set of nets. At operation 305, the computing device identifies one or more timing-critical nets from the netlist. The computing device may identify a net as a timing-critical net based on any one or more of the following: detecting a negative slack in a timing path of the net; determining one or more sensitivity values of the net satisfy a threshold condition (e.g., a sensitivity value exceeds a predetermined sensitivity value threshold); determining a wirelength of the net exceeds a predefined wirelength threshold; and determining a signal delay of the net exceeds a predefined threshold. A sensitivity value comprises a measure of impact a given net has on the timing of the IC design. Consistent with these embodiments, the set of nets referenced in connection with the operations described above in reference to FIG. 2 correspond to timing-critical nets. That is, the computing device performs routing and initial layer assignment on timing-critical nets (operation 210 and 215), performs timing-based layer assignment on the timing-critical nets (operation 220), and updates the data based on the timing-based layer assignment of the timing-critical nets (operation 225).

Consistent with some embodiments, the operations 310, 315, and 320 can be performed as part of the operation 220 where the computing device performs timing-based layer assignment on the set of nets. At operation 310, the computing device obtains the first delay value (e.g., an Elmore delay value) comprising a first measure of signal delay associated with the net based on the routing path of the net being assigned to the first layer (e.g., based on a preferred routing designation of the first layer or a layer below the first layer). The computing device obtains the first delay value using an internal timer to measure a signal delay of the net with the route assigned to the first layer.

At operation 315, the computing device determines a second preferred routing designation for the net based on a comparison of the first delay value with one or more delay values corresponding to preferred routing designations of different layers from among the set of layers. The one or more delay values include at least the second delay value associated the second preferred routing layer designation.

At operation 320, the computing device selects the second layer, from among the set of layers, for reassignment of at least a portion of the route based on the second preferred routing layer designation. For example, the computing device assigns the routing path of the net to the first layer based on a first preferred routing layer designation corresponding to the first layer or a layer below the first layer, as discussed above, and the computing device may select the second layer for reassignment of at least a portion of the routing path based on a second preferred routing layer designation corresponding to the second layer or a layer below the second layer.

As shown in FIG. 4, for some embodiments, the operation 315 includes operations 405, 410, 415, 420, and 425, which may be performed in multiple iterations. At operation 405, the computing device identifies a candidate layer from the set of layers to for designation as a preferred routing layer (the second preferred routing layer designation). In an initial iteration, the computing device may select the layer above the first layer, while in subsequent iterations the computing device may select the layer above the candidate layer from the prior iteration.

The computing device obtains a second delay value associated the candidate layer, at operation 410. The second delay value comprises a second measure of delay associated with the candidate layer being designated as a preferred routing layer for the net. For example, the second delay value may be based on portions of the routing path of the net being assigned to the candidate layer and/or a layer above the candidate layer. The computing device obtains the second delay value using an internal timer to measure a signal delay of the net with the route being assigned based on the candidate layer being designated as a preferred routing layer.

At operation 415, the computing device computes a difference between the second delay value and the first delay value (i.e., a result of subtracting the second delay value from the first delay value). The computing device, at operation 420, determines whether the difference between the second delay value and the first delay value satisfies a threshold constraint. For example, the threshold constraint may comprise a threshold value, and in determining whether the difference satisfies the threshold constraint the computing device determines whether the difference exceeds the threshold value.

If the difference satisfies the threshold constraint, the computing device selects the candidate layer for designation as the preferred routing layer for the net, at operation 425. In the example from above, the computing device may select the candidate layer based on the difference exceeding the threshold value. The computing device reassigns at least a portion of the route to the second layer (at operation 315) based on the candidate layer selected being designated as the preferred routing layer for the net.

If the difference does not satisfy the threshold constraint, the method 200 returns to operation 405 where a new candidate layer is selected and the process is repeated.

Figure 5:
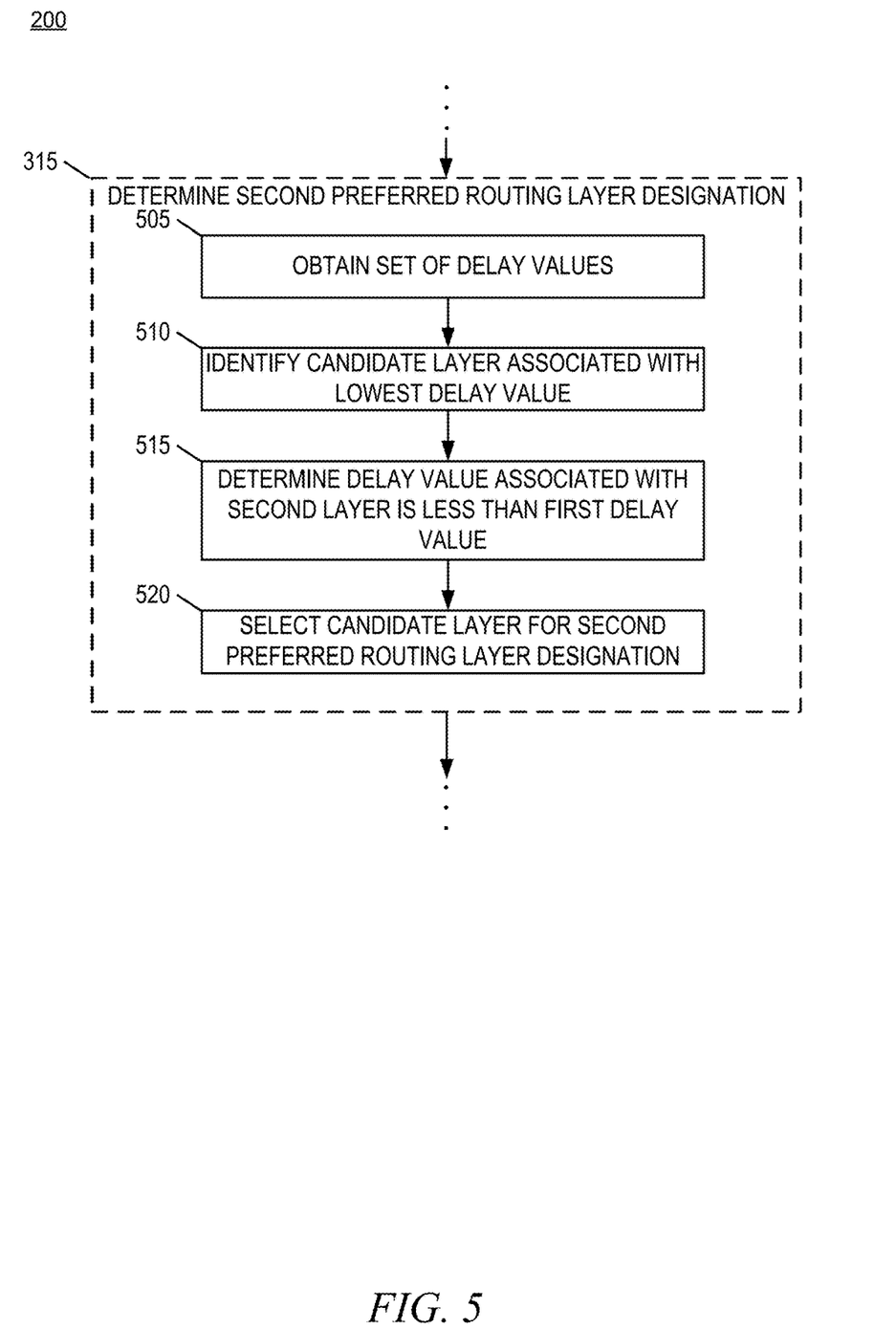

As shown in FIG. 5, for some embodiments, the operation 315 includes operation 505, 510, 515, and 520. At operation 505, the computing device obtains a set of delay values where each delay value is associated with one of the layers in the set of layers (other than the first layer) being designated as a preferred routing layer. The computing device obtains set of delay values using the internal timer to measure a signal delay of the net associated with each layer being designated as a preferred routing layer (other than the layer initially designated as the preferred routing layer). For example, a delay value in the set of delay values may be based on portions of the routing path of the net being assigned to the layer designated as a preferred routing layer and/or a layer above the designated layer At operation 510, the computing device identifies a candidate layer that is associated with the lowest delay value in the set of delay values (a second delay value). At operation 515, the computing device determines the lowest delay value is less than the first delay value. Based on the lowest delay value being lower than the first delay value, the computing device selects the candidate layer associated with the lowest delay value for designation as the preferred routing layer for the net (the second preferred routing layer designation), at operation 520.

Figure 6A:
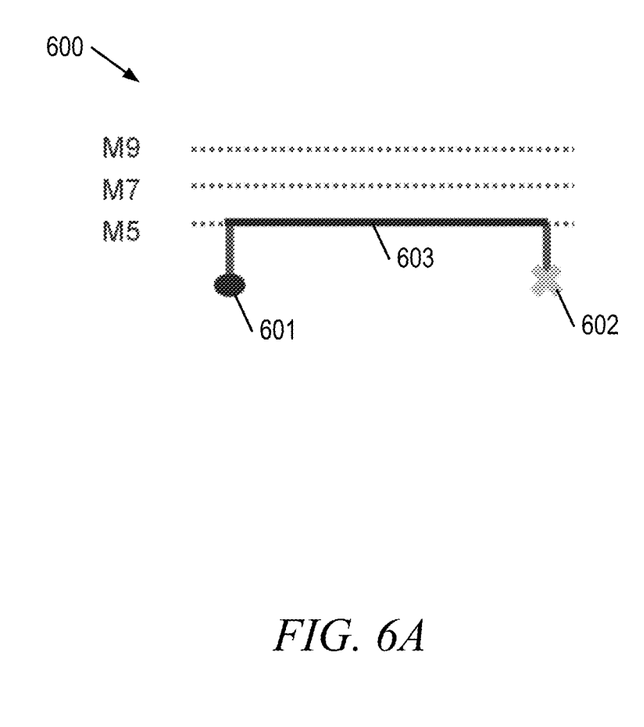
FIGS. 6A and 6B are conceptual diagrams illustrating an example method for timing-based layer assignment, according to some example embodiments.
Figure 6B:
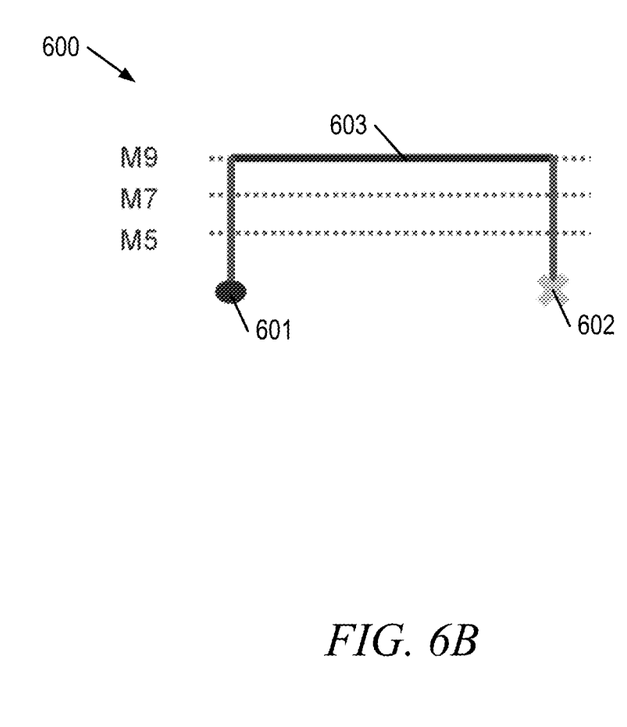

FIGS. 6A and 6B are conceptual diagrams illustrating an example of the method 200 for timing-based layer assignment, according to some example embodiments. FIG. 6A shows a signal net 600 of an IC design. The net 600 comprises a pin 601 and a pin 602. A route 603 connecting pins 601 and 602 is generated during routing of the net 600 (e.g., at operation 215) and assigned to layer M5 from among multiple layers of the IC design during an initial layer assignment operation (e.g., operation 220) based on a first preferred routing layer designation (e.g., corresponding to layer M5 or a layer below M5 that is not illustrated).

A timing-based layer assignment is performed on the net 600 (e.g., operation 225) and as a result, the route 603 that interconnects the net 600 is reassigned to a layer M9, as shown in FIG. 6B. During timing-based layer assignment, a first delay value associated with assignment of the route 603 for the net 600 to the layer M5 is determined. The first delay value is used as a reference for comparison in evaluating whether the route 603 for the net 600 is to be reassigned to a different layer based on whether reassignment to the different layer provides an improvement to the timing of the net 600 (e.g., a reduction in delay and/or improvement to timing closure). That is, the first delay value can be compared to delays values associated with other layers being designated as a preferred routing layer (e.g., resulting in assignment of the route 603 on other layers such as layer M7 or layer M9). For example, the first delay value can be compared with a second delay value associated with M9 being designated as a preferred routing layer (e.g., resulting in assignment of the route 603 of the net 600 to layer M9). For some embodiments, the layer M9 is selected for reassignment of the route 603 based on a difference between the first delay value and the second delay value satisfying a threshold constraint (e.g., when the difference exceeds a threshold value defined by a threshold constraint). For some embodiments, the layer M9 is selected for reassignment of the route 603 based on the second delay value being lower than the first value and being the lowest delay value of delay values associated with assignment of the route 603 on other layers of the design less than the first delay value. In either instance, reassignment of the route 603 from the layer M5 to the layer M9 results in a reduced delay for the net 600 and an improvement to timing closure.

Figure 7:
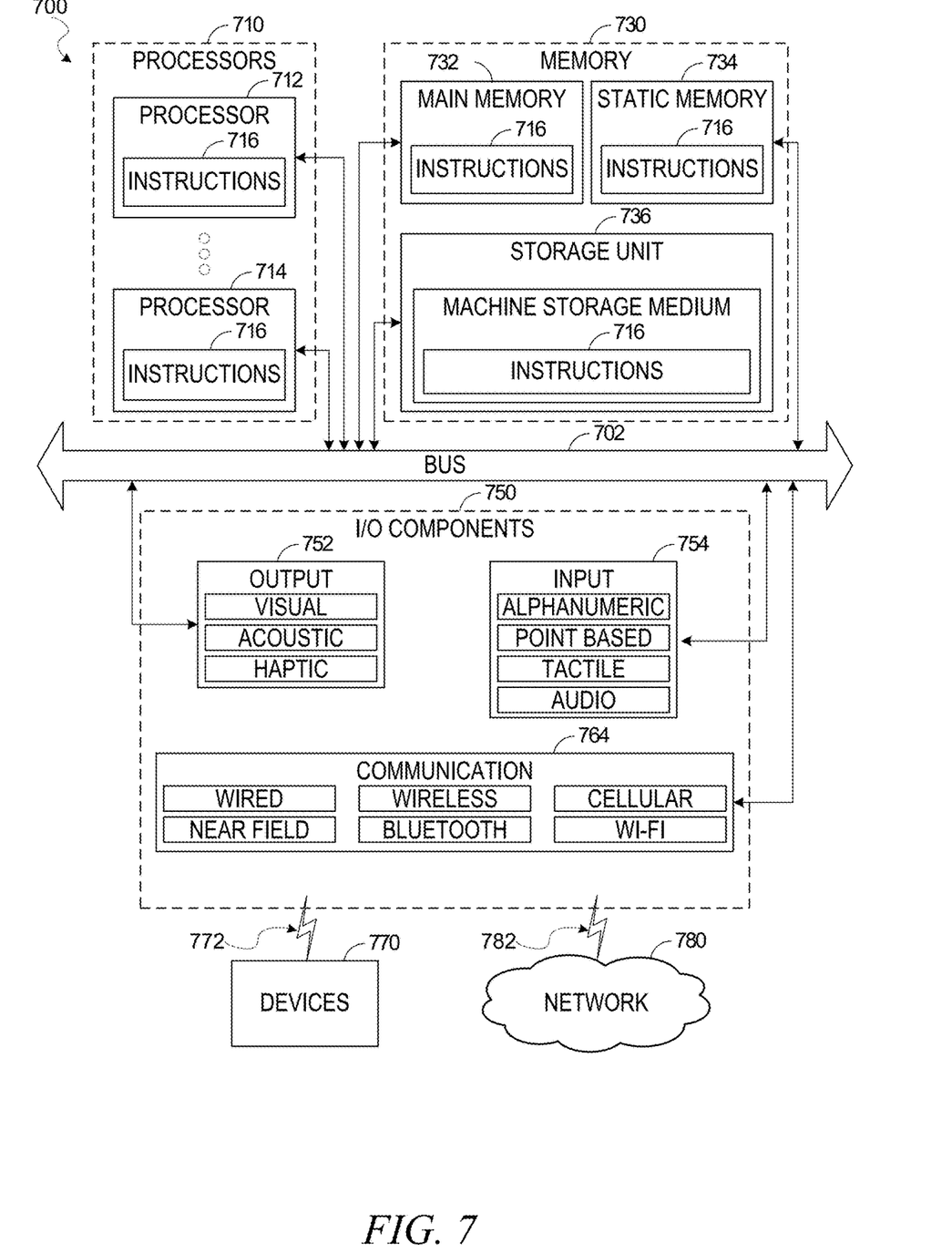
FIG. 7 is a diagrammatic representation of a machine in the example form of a computer system within which a set of instructions for causing the machine to perform any one or more of the methodologies discussed herein may be stored and executed.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute an EDA software system that executes the method 200. Additionally, or alternatively, the instructions 716 may implement the design flow of FIG. 1. The instructions 716 transform the general, non-programmed machine 700 into a particular machine 700 programmed to carry out the described and illustrated functions in the manner described here. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components (NFC, Bluetooth, and Wi-Fi) to provide communication via other modalities. The devices 770 may be another machine or any of a wide variety of peripheral devices (e.g., a peripheral device coupled via a universal serial bus (USB)).

Executable Instructions and Machine-Storage Medium

The various memories (e.g., 730, 732, 734, and/or memory of the processor(s) 710) and/or the storage unit 736 may store one or more sets of instructions and data structures (e.g., software) embodying or utilized by any one or more of the methodologies or functions described herein. These instructions, when executed by the processor(s) 710, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public-switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
   accessing, from memory, data describing an integrated circuit design, the integrated circuit design comprising a set of nets;
   routing the set of nets, the routing of the set of nets comprising generating a route between a first pin and a second pin of a net;
   performing an initial layer assignment on the set of nets based on the routing of the set of nets, the performing of the initial layer assignment comprising assigning the route of the net to a first layer of the integrated circuit design based on a first preferred routing layer designation,
   performing a timing-based layer assignment on the set of nets based on the initial layer assignment of the nets, the performing of the timing-based layer assignment comprising:
     obtaining a set of delay values, each delay value corresponding to a designation of a layer from among the set of lavers as a preferred routing layer;
     identifying a second layer from the set of layers based on a second delay value associated with the second layer being a lowest delay value in the set of delay values;
     based on the second delay value being the lowest delay value in the set of values, selecting the second layer for a second preferred routing layer designation for the net; and
     reassigning at least a portion of the route from the first layer to the second layer of the integrated circuit design based on the second preferred routing layer designation; and
   updating the data describing the integrated circuit design based on the timing-based layer assignment.

2. The system of claim 1, wherein the performing of the timing-based layer assignment further comprises:
   obtaining the first delay value, the first delay value comprising a first measure of signal delay associated with the net based on the route being assigned to the first layer; and
   obtaining the second delay value, the second delay value comprising a second measure of signal delay associated with the second preferred routing layer designation.

3. The system of claim 2, wherein the operations further comprise:
obtaining the first delay value comprises using an internal timer to measure a signal delay associated with the net based on the route being assigned to the first layer; and
obtaining the second delay value comprises using the internal timer to measure a signal delay associated with the second preferred routing layer designation.

4. The system of claim 1, wherein the selecting of the second layer for the second preferred routing layer designation is further based on a comparison of the first delay value with the second delay value.

5. The system of claim 4, wherein the selecting of the second layer for the second preferred routing layer designation comprises:
computing a difference between the first delay value and the second delay value;
determining whether the difference satisfies a threshold constraint; and
selecting the second layer for the second preferred routing layer designation based on determining that the difference between the second delay value and the first delay value satisfies the threshold constraint.

6. The system of claim 5, wherein:
the threshold constraint specifies a threshold value; and
the determining of whether the difference satisfies the threshold constraint comprises determining whether the difference exceeds the threshold value.

7. The system of claim 1, wherein the selecting of the second layer for the second preferred routing layer designation comprises:
determining the second delay value is less than the first delay value.

8. The system of claim 1, wherein:
the set of nets comprise one or more timing-critical nets; and
the operations further comprise identifying the one or more timing-critical nets from among a plurality of nets specified by a netlist of the integrated circuit design based on one or more timing characteristics of the one or more timing-critical nets.

9. The system of claim 1, wherein the operations further comprise:
generating a layout instance for the integrated circuit design based on the timing-based layer reassignment, the layout instance describing physical dimensions of a device based on the integrated circuit design.

10. A method comprising:
accessing, from memory, data describing an integrated circuit design, the integrated circuit design comprising a set of nets;
generating, by at least one hardware processor, a route between a first pin and a second pin of a net from the set of nets;
assigning the route of the net to a first layer of the integrated circuit design based on a first preferred routing layer designation;
obtaining a set of delay values, each delay value corresponding to a designation of a layer from among the set of layers as a preferred routing layer;
identifying a second layer from the set of layers based on a second delay value associated with the second layer being a lowest delay value in the set of delay values;
based on the second delay value being the lowest delay value in the set of values, selecting the second layer for a second preferred routing layer designation for the net;
reassigning the route from the first layer to the second layer based on the second preferred routing layer designation; and
updating the data describing the integrated circuit design based on the reassigning of the route from the first layer to the second layer.

11. The method of claim 10, further comprising:
obtaining the first delay value, the first delay value comprising a first measure of signal delay associated with the net based on the route being assigned to the first layer; and
obtaining the second delay value, the second delay value comprising a second measure of signal delay associated with the second preferred routing layer designation.

12. The method of claim 11, further comprising:
obtaining the first delay value comprises using an internal timer to measure a signal delay associated with the net based on the route being assigned to the first layer; and
obtaining the second delay value comprises using the internal timer to measure a signal delay associated with the net based on the route being assigned based on the second preferred routing layer designation.

13. The method of claim 12, wherein:
the set of nets comprise one or more timing-critical nets; and
the method further comprises identifying the one or more timing-critical nets from among a plurality of nets specified by a netlist of the integrated circuit design based on one or more timing characteristics of the one or more timing-critical nets.

14. The method of claim 11, further comprising selecting of the second layer for the second preferred routing layer designation is further based on a comparison of the first delay value with the second delay value.

15. The method of claim 14, wherein the selecting of the second layer for the second preferred routing layer designation comprises:
computing a difference between the first delay value and the second delay value;
determining whether the difference satisfies a threshold constraint; and
selecting the second layer based on determining that the difference between the second delay value and the first delay value satisfies the threshold constraint.

16. The method of claim 15, wherein:
the threshold constraint specifies a threshold value; and
the method further comprises determining whether the difference satisfies the threshold constraint comprises determining whether the difference exceeds the threshold value.

17. The method of claim 10, further comprising:
generating a layout instance for the integrated circuit design based on the reassigning of the net from the first layer to the second layer, the layout instance describing physical dimensions of a device based on the integrated circuit design.

18. A computer storage medium storing instructions, which when executed by a machine, cause the machine to perform operations comprising:
accessing, from memory, data describing an integrated circuit design, the integrated circuit design comprising a plurality of nets;
identifying a set of timing-critical nets from the plurality of nets based on one or more timing characteristics of the one or more timing-critical nets;

routing the set of timing-critical nets, the routing of the set of timing-critical nets comprising generating a route between a first pin and a second pin of a net;

performing an initial layer assignment on the set of timing-critical nets based on the routing of the set of timing-critical nets, the performing of the initial layer assignment comprising assigning the route of the net to a first layer of the integrated circuit design based on a first preferred routing layer designation;

performing a timing-based layer assignment on the set of timing-critical nets based on the initial layer assignment of the nets, the performing of the timing-based layer assignment comprising:

obtaining a set of delay values, each delay value corresponding to a designation of a layer from among the set of layers as a preferred routing layer;

identifying a second layer from the set of layers based on a second delay value associated with the second layer being a lowest delay value in the set of delay values;

based on the second delay value being the lowest delay value in the set of values, selecting the second layer for a second preferred routing layer designation for the net; and    reassigning the route from the first layer to the second layer of the integrated circuit design based on a second preferred routing layer designation; and updating the data describing the integrated circuit design based on the timing-based layer assignment.

19. The computer storage medium of claim 18, wherein:

the performing of the timing-based layer assignment further comprises:

computing a difference between the first delay value and the second delay value;

determining whether the difference satisfies a threshold constraint; and    selecting the second layer for the second preferred routing layer designation based on determining the difference between the second delay value and the first delay value satisfies the threshold constraint.

20. The computer storage medium of claim 18, wherein the selecting of the second layer as the second preferred routing layer designation comprises:

determining the second delay value is less than the first delay value.

\* \* \* \* \*